United States Patent
Shiraga

(10) Patent No.: US 11,221,807 B2
(45) Date of Patent: Jan. 11, 2022

(54) NON-TRANSITORY COMPUTER-READABLE MEDIUM AND DEVICE MANAGEMENT SYSTEM

(71) Applicant: BROTHER KOGYO KABUSHIKI KAISHA, Nagoya (JP)

(72) Inventor: Naoto Shiraga, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/143,949

(22) Filed: Jan. 7, 2021

(65) Prior Publication Data

US 2021/0208827 A1    Jul. 8, 2021

(30) Foreign Application Priority Data

Jan. 8, 2020    (JP) .............................. JP2020-001475

(51) Int. Cl.
*G06F 15/00* (2006.01)
*G06F 3/12* (2006.01)
*G06K 1/00* (2006.01)

(52) U.S. Cl.
CPC .......... *G06F 3/1231* (2013.01); *G06F 3/1204* (2013.01); *G06F 3/1286* (2013.01)

(58) Field of Classification Search
CPC ..... G06F 3/1231; G06F 3/1204; G06F 3/1286
USPC ............................ 358/1.15, 1.14, 1.13, 1.1
See application file for complete search history.

(56) References Cited

U.S. PATENT DOCUMENTS

| | | | |
|---|---|---|---|
| 2014/0222896 A1* | 8/2014 | Okuno | H04L 67/42 709/203 |
| 2018/0077009 A1* | 3/2018 | Kimura | H04L 41/08 |
| 2018/0247048 A1* | 8/2018 | Sakemi | G06F 21/45 |
| 2018/0343365 A1* | 11/2018 | Hirasawa | G06F 3/1231 |
| 2019/0166642 A1* | 5/2019 | Takeda | H04W 88/10 |
| 2019/0319922 A1 | 10/2019 | Nishizaki | |

FOREIGN PATENT DOCUMENTS

| | | |
|---|---|---|
| JP | 2017-536598 A | 12/2017 |
| JP | 2019-185524 A | 10/2019 |
| WO | 2016/048417 A1 | 3/2016 |

* cited by examiner

*Primary Examiner* — Douglas Q Tran
(74) *Attorney, Agent, or Firm* — Kenealy Vaidya LLP

(57) ABSTRACT

A non-transitory computer-readable medium storing a mediation program readable by a computer of a mediation apparatus of a device management system including a management apparatus managing a first device registered as a direct management target without intervention of the mediation apparatus and managing the first device and/or the second device registered as an indirect management target via the mediation apparatus, the mediation program causing the mediation apparatus to: receive related information about the first device from the first device; determine whether the first device is registered on the management apparatus as the direct management target or the indirect management target; and when the first device is not registered as either the direct management target or the indirect management target, transmit a registration request for requesting the management apparatus to register the first device as the indirect management target.

15 Claims, 11 Drawing Sheets

FIG. 3

<MANAGEMENT DATABASE>

| MEDIATION NUMBER | IP ADDRESS | SERIAL NUMBER | NODE NAME | ... |
|---|---|---|---|---|
| 1 | 192.168.0.1 | 1111A (SECOND DEVICE 51) | BRW1111A | ... |
| 1 | 192.168.0.2 | 1111B (SECOND DEVICE 52) | BRW1111B | ... |
| 1 | 192.168.0.3 | 1111C (SECOND DEVICE 53) | BRW1111C | ... |
| 1111D | 192.168.0.4 | 1111D (FIRST DEVICE 54) | BRW1111D | ... |
| 1111E | 192.168.0.5 | 1111E (FIRST DEVICE 55) | BRW1111E | ... |
| ... | ... | ... | ... | ... |

NON-TRANSITORY COMPUTER-READABLE MEDIUM AND DEVICE MANAGEMENT SYSTEM

CROSS-REFERENCE TO RELATED APPLICATIONS

This application is based on and claims priority under 35 USC 119 from Japanese Patent Application No. 2020-001475 filed on Jan. 8, 2020, the contents of which are incorporated herein by reference.

TECHNICAL FIELD

The present disclosure relates to technology of managing a variety of devices.

BACKGROUND

A related-art management system is configured to manage a printer having no function of directly connecting to the Internet from an apparatus for management connected to the Internet, via a mediation apparatus within an intranet to which the printer belongs.

The mediation apparatus is configured to obtain information about a printer through broadcasting to the printer within the intranet, and to transmit the information to the apparatus for management via the Internet. The apparatus for management registers the printer indicated by the information transmitted from the mediation apparatus, as a management target. The printer registered in this manner is managed via the mediation apparatus.

SUMMARY

One illustrative aspect of the present disclosure provides a non-transitory computer-readable medium storing a mediation program readable by a computer of a mediation apparatus of a device management system, the device management system including: a management apparatus; the mediation apparatus configured to communicate with the management apparatus; a first device configured to communicate with the management apparatus and the mediation apparatus; and a second device configured to communicate with the mediation apparatus, the management apparatus being configured to manage the first device registered on the management apparatus as a device of a direct management target by communication with the first device, without intervention of the mediation apparatus, the management apparatus being configured to manage the first device and/or the second device registered on the management apparatus as a device of an indirect management target via the mediation apparatus, the mediation program, when executed by the computer, causing the mediation apparatus to perform: receiving related information about the first device from the first device; determining whether the first device is registered on the management apparatus as the direct management target or the indirect management target, based on the received related information; and in a case it is determined that the first device is not registered as either the direct management target or the indirect management target, transmitting a registration request to the management apparatus, the registration request requesting the management apparatus to register the first device as the indirect management target.

According to the above configuration, the first device is suppressed from being double-registered as the direct management target and the indirect management target.

Another illustrative aspect of the present disclosure provides a non-transitory computer-readable medium storing a management program readable by a computer of a management apparatus of a device management system, the device management system including: the management apparatus; a mediation apparatus configured to communicate with the management apparatus; a first device configured to communicate with the management apparatus and the mediation apparatus; and a second device configured to communicate with the mediation apparatus, the management apparatus being configured to manage the first device registered on the management apparatus as a device of a direct management target by communication with the first device, without intervention of the mediation apparatus, the management apparatus being configured to manage the first device and/or the second device registered on the management apparatus as a device of an indirect management target via the mediation apparatus, the mediation apparatus being configured to: receive device specifying information specifying the first device from the first device; and transmit a registration request to the management apparatus, the registration request requesting the management apparatus to register the first device as the indirect management target, the registration request including the received device specifying information, the management program, when executed by the computer, causing the management apparatus to perform: storing registered information, the registered information indicating devices of the direct management target and the indirect management target registered on the management apparatus; receiving the registration request transmitted from the mediation apparatus; determining whether the first device is registered as the direct management target or the indirect management target, based on the device specifying information included in the received registration request and the stored registered information; and in a case it is determined that the first device is not registered as either the direct management target or the indirect management target, registering the first device as the indirect management target.

Even with the above configuration, the first device is suppressed from being double-registered as the direct management target and the indirect management target.

Further illustrative aspect of the present disclosure provides a device management system including: a management apparatus; a mediation apparatus configured to communicate with the management apparatus; a first device configured to communicate with the management apparatus and the mediation apparatus; and a second device configured to communicate with the mediation apparatus, wherein the management apparatus is configured to manage the first device registered on the management apparatus as a device of a direct management target by communication with the first device, without intervention of the mediation apparatus, wherein the management apparatus is configured to manage the first device and/or the second device registered on the management apparatus as a device of an indirect management target via the mediation apparatus, wherein the mediation apparatus includes a controller configured to: receive related information about the first device from the first device; determine whether the first device is registered on the management apparatus as the direct management target or the indirect management target, based on the received related information; and in a case it is determined that the first device is not registered as either the direct management target or the indirect management target, transmit a registration request to the management apparatus, the registration request requesting the management apparatus to register the first device as the indirect management target.

According to the device management system configured in this manner, the first device is suppressed from being double-registered as the direct management target and the indirect management target, like each of the above-described programs.

BRIEF DESCRIPTION OF DRAWINGS

Illustrative embodiments of the disclosure will be described in detail based on the following figures, wherein:

FIG. 3 depicts an example of a management database of the illustrative embodiment;

DETAILED DESCRIPTION

Printers that are managed within the intranet may also include a printer having a function that can connect to the Internet. Such printer can be directly managed from the apparatus for management via the Internet, without intervention of the mediation apparatus.

However, when a printer that is managed via the mediation apparatus and a printer that is managed without intervention of the mediation apparatus coexist within the intranet, a double-managed situation where the printer registered to be managed without intervention of the mediation apparatus is further managed via the mediation apparatus may occur. Specifically, the printer registered to be managed without intervention of the mediation apparatus may respond to the broadcast from the mediation apparatus. In this case, if the mediation apparatus transmits information of the registered printer to the apparatus for management, the registered printer may also be registered on the apparatus for management, as a printer to be managed via the mediation apparatus.

Therefore, illustrative aspects of the present disclosure provide a technology suppressing the same printer from being double-managed.

Hereinbelow, illustrative embodiments of the present disclosure will be described with reference to the drawings.

Illustrative Embodiment (1-1) Outline of Device Management System

Figure 1:
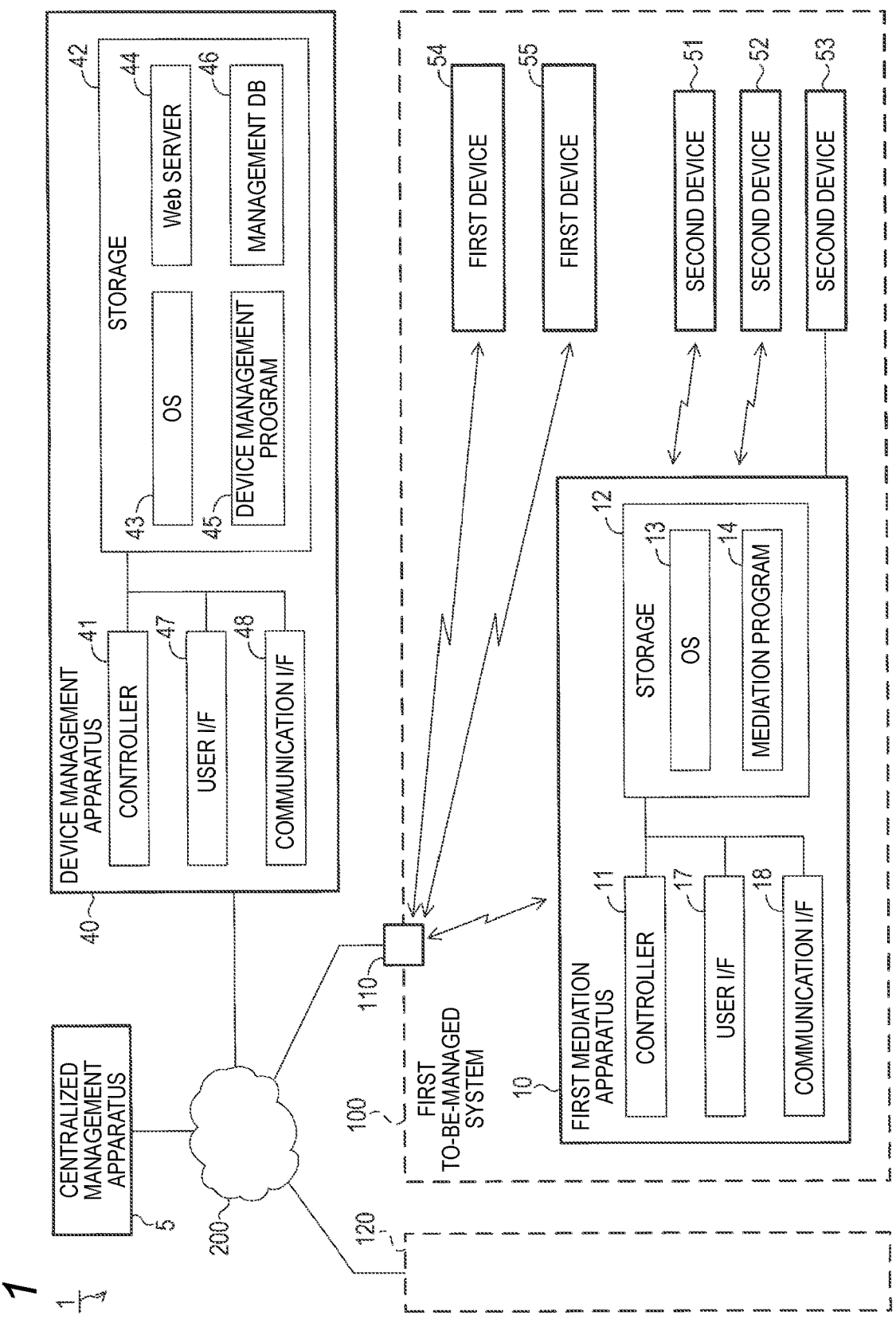
FIG. 1 depicts a schematic configuration of a device management system of an illustrative embodiment.

A device management system 1 shown in FIG. 1 includes a centralized management apparatus 5, a device management apparatus 40, and at least one to-be-managed system. Each of the to-be-managed systems includes a mediation apparatus.

In the present illustrative embodiment, the device management system 1 includes, for example, two to-be-managed systems. Specifically, as shown in FIG. 1, the device management system 1 includes a first to-be-managed system 100, and a second to-be-managed system 120. The first to-be-managed system 100 includes a first mediation apparatus 10.

The first to-be-managed system 100 further includes a plurality of devices. In the present illustrative embodiment, the first to-be-managed system 100 includes, for example, five devices. Specifically, the first to-be-managed system 100 includes two first devices 54 and 55, and three second devices 51, 52 and 53.

Each of the devices 51 to 55 has no function of directly performing communication with the centralized management apparatus 5. Each of the second devices 51, 52 and 53 can communicate with the first mediation apparatus 10 but cannot communicate with the device management apparatus 40. Each of the first devices 54 and 55 can communicate the device management apparatus 40 as well as the first mediation apparatus 10.

Each of the devices 51 to 55 may be any device. Each of the devices 51 to 55 may be, for example, a small device that can be easily carried. Each of the devices 51 to 55 may also be, for example, a device that cannot be easily carried or a device that is used with being stationary. In the present illustrative embodiment, each of the devices 51 to 55 is, for example, a small device that can be easily carried.

More specifically, in the present illustrative embodiment, the first devices 54 and 55 and the second devices 51, 52 and 53 each have a printer function, for example. The printer function is a function of recording an image based on image data on a to-be-recorded medium. In the present illustrative embodiment, the first device 55 further has a scan function. The scan function is a function of reading an image recorded on a document and generating image data indicative of the read image.

The centralized management apparatus 5 and the device management apparatus 40 are connected to a global network 200, and can communicate with each other via the global network 200. The global network 200 may be any network. In the present illustrative embodiment, the global network 200 is the Internet configured to perform communication according to so-called TCP/IP protocols, for example.

The first to-be-managed system 100 includes a first local network (not shown). The first local network may also be a so-called intranet. The first mediation apparatus 10 and each of the first devices 54 and 55 are connected to the first local network. The first mediation apparatus 10 and each of the first devices 54 and 55 can communicate with each other via the first local network.

The first local network may be a wired network, a wireless network or a mixed network of wired and wireless networks. In the present illustrative embodiment, the first local network performs communication according to communication protocols including TCP/IP protocols, for example. More specifically, the first local network of the present illustrative embodiment is a so-called wireless LAN (abbreviation of Local Area Network) based on IEEE 802.11 standards, for example.

The first to-be-managed system 100 further includes a first relay apparatus 110. The first relay apparatus 110 is connected to the global network 200 and the first local network, and is configured to relay communication between the global network 200 and the first local network. The first relay apparatus 110 may also have a function of a so-called broadband router. Communication between an apparatus connected to the first local network and an apparatus connected to the global network 200 is performed via the first relay apparatus 110. For example, the first mediation apparatus 10 and each of the first devices 54 and 55 can communicate with the device management apparatus 40 via the first relay apparatus 110.

The first relay apparatus 110 may have a function of a so-called broadband router and have a firewall for limiting an access from the global network 200 to the first to-be-managed system 100. The firewall may be implemented by hardware or by software processing.

In the present illustrative embodiment, each of the second devices 51, 52 and 53 has no function of connecting to the first local network but can communicate with the first mediation apparatus 10. The first mediation apparatus 10 is configured to perform communication with the second devices 51, 52 and 53, thereby mediating management of the second devices 51, 52 and 53 by the device management apparatus 40. Each of the second devices 51, 52 and 53 may also communicate with the first mediation apparatus 10 by any communication method except the first local network. In the present illustrative embodiment, for example, each of the second devices 51 and 52 is configured to communicate with the first mediation apparatus 10 by Bluetooth (a registered trademark of BluetoothSIG, Inc.), for example, and the second device 53 is configured to communicate with the first mediation apparatus 10 by a USB (abbreviation of Universal Serial Bus), for example.

The second to-be-managed system 120 includes, for example, a second mediation apparatus (not shown) having a similar configuration to the first mediation apparatus 10, and a second relay apparatus (not shown) having a similar configuration to the first relay apparatus 110. The second to-be-managed system 120 may further include one or more first devices (not shown) having a similar configuration to any one of the first devices 54 and 55. The second to-be-managed system 120 may further include one or more second devices (not shown) having a similar configuration to any one of the second devices 51, 52 and 53. Note that, the device management system 1 may include some to-be-managed systems.

The device management system 1 includes some of a so-called mobile device management system (MDM system). That is, the centralized management apparatus 5 is possessed by a first company that provides a service of the MDM system, for example. In the meantime, the device management apparatus 40 and the first mediation apparatus 10 are possessed by a second company that wants to manage each of the devices 51 to 55 by using the MDM system, for example. The first mediation apparatus 10 may be provided at one of a plurality of branch offices of the second company, for example. That is, the first to-be-managed system 100 and the second to-be-managed system 120 may be each equipped at one of branch offices, which are different from each other, of a plurality of branch offices.

The centralized management apparatus 5 can perform communication with mobile terminals (not shown) of diverse management targets in the MDM system, thereby managing the mobile terminals. It is one of basic functions in the MDM system that the centralized management apparatus 5 manages the mobile terminals by performing communication with the mobile terminals.

The centralized management apparatus 5 of the present illustrative embodiment can further manage a device (hereinbelow, referred to as "registration device"), which is registered as a management target in the device management system 1, of the first devices 54 and 55 and the second devices 51, 52 and 53 having no function of directly performing communication with the centralized management apparatus 5.

More specifically, the centralized management apparatus 5 is configured to manage the registration device via the device management apparatus 40. For example, in a case where the first devices 54 and 55 are registration devices, the device management apparatus 40 manages each of the first devices 54 and 55 by performing communication with the first devices 54 and 55. For example, in a case where the second devices 51, 52 and 53 are registration devices, the device management apparatus 40 manages each of the second devices 51, 52 and 53 via the first mediation apparatus 10 by performing communication with the first mediation apparatus 10.

The management by the device management apparatus 40 includes, for example, obtaining information from a registration device and/or requesting an action from a registration device. The information that is obtained from the registration device may include, for example, status information. The status information may include, for example, diverse setting values that are used in the registration device. The diverse setting values may include, for example, fonts, font sizes, concentrations, image qualities, sheet sizes, a printing history, a remaining amount of a coloring agent and the like that are used in the printer function. The action may include, for example, changing the setting values that are used in the registration device and/or deleting the setting values from the registration device. The action may also include updating, deleting and/or newly installing software that is used in the registration device.

The centralized management apparatus 5 is configured to directly perform communication with the device management apparatus 40, thereby managing the registration device via the device management apparatus 40. That is, for example, the centralized management apparatus 5 obtains, from the device management apparatus 40, information obtained from the registration device by the device management apparatus 40. The centralized management apparatus 5 requests an action from the device management apparatus 40, thereby requesting the action from the registration device via the device management apparatus 40, for example. When a registration request of an action for a specific registration device is received from the centralized management apparatus 5, the device management apparatus 40 registers the action. Then, the device management apparatus 40 transmits action information indicative of the registered action to the registration device, thereby causing the registration device to execute the action.

That is, in the device management system 1, the device management apparatus 40 is configured to directly manage the registration device. However, the management of the registration device by the device management apparatus 40 is performed according to a variety of requests from the centralized management apparatus 5, as required. In the meantime, the centralized management apparatus 5 is configured to indirectly manage the registration device via the device management apparatus 40. The device management apparatus 40 has both a function of managing directly the registration device and a function of relaying a variety of requests of the centralized management apparatus 5 to the registration device.

The registration device is registered on both the centralized management apparatus 5 and the device management apparatus 40. The registration of the registration device on the device management apparatus 40 is performed by registering information about the device on a management database 46 (which will be described later) of the device management apparatus 40. Note that, "database" is hereinbelow abbreviated as "DB".

In the device management apparatus 40, the registration device is registered as a direct management target or an indirect management target. The registration device of a direct management target means a registration device that can be managed by the device management apparatus 40 through communication with the registration device, without intervention of the first mediation apparatus 10. The registration device of an indirect management target means a registration device that can be managed by the device management apparatus 40 via the first mediation apparatus 10.

In the present illustrative embodiment, each of the first devices 54 and 55 can be registered as either a direct management target or an indirect management target. Each of the second devices 51, 52 and 53 can be registered as the indirect management target.

When each of the second devices 51, 52 and 53 is registered as a management target, it is associated with the first mediation apparatus 10. The registration device is associated with the first mediation apparatus 10 by recording the registration device in an association device list provided in the first mediation apparatus 10, for example.

When a device is registered on the device management apparatus 40, as a management target, information of the registration device is transmitted from the device management apparatus 40 to the centralized management apparatus 5. Thereby, the registration device is also registered on the centralized management apparatus 5, as a management target, so that the registration device can be managed from the centralized management apparatus 5.

An administrator of the registration device can manage the registration device by accessing a site for management of the centralized management apparatus 5 with a Web browser, for example. Specifically, the administrator can browse the information of the registration device by accessing the site for management, for example. The administrator can also request the action from the registration device through the site for management, for example.

The administrator can manage the registration device in a similar manner to the management in the centralized management apparatus 5 by accessing the site for device management of the device management apparatus 40 via a user I/F 47 (which will be described later) of the device management apparatus 40 or with a Web browser. Note that, "I/F" is an abbreviation of "interface".

(1-2) Configuration of Device Management Apparatus

As shown in FIG. 1, the device management apparatus 40 includes a controller 41, a storage 42, a user I/F 47, and a communication I/F 48.

The controller 41 includes, for example, a CPU (abbreviation of Central Processing Unit). The storage 42 includes a semiconductor memory such as a ROM (abbreviation of Read Only Memory), a RAM (abbreviation of Random Access Memory), an NVRAM (abbreviation of Non-Volatile RAM), a flash memory, an SSD (abbreviation of Solid State Drive) and the like, for example. That is, the device management apparatus 40 includes a computer including the CPU and the semiconductor memory. The storage 42 may also have a memory such as a hard disk drive different from the semiconductor memory, for example. In the storage 42, a variety of programs including an operating system 43, a Web server 44, a device management program 45 and a management DB 46, data and the like are stored. Hereinbelow, the "operating system" is abbreviated as "OS".

The controller 41 is configured to execute a program stored in a non-transitory tangible recording medium, thereby implementing diverse functions. In the present illustrative embodiment, the storage 42 corresponds to a non-transitory tangible recording medium having a program stored thereon. Note that, the present disclosure is not limited to the configuration where the diverse functions are implemented by the execution of the controller 41 are implemented by the execution of the program. For example, some or all of the functions may also be implemented by one or more hardware.

As shown in FIG. 3, the management DB 46 includes management information of each registration device. The management information includes a variety of information such as a mediation number, an IP address, a serial number, a node name and the like of a corresponding device.

The mediation number is a number for specifying a mediation apparatus associated with the registration device. That is, the device management apparatus 40 is configured to separately register each of the registration devices, based on via which mediation apparatus the registration device is to be managed.

The mediation number "1" indicates that the registration device is associated with the first mediation apparatus 10, i.e., the registration device is registered to be managed via the first mediation apparatus 10. That is, the registration device whose mediation number is "1" indicates a registration device of an indirect management target.

On the other hand, the registration device of a direct management target is managed without intervention of the mediation apparatus. For this reason, a mediation number of a registration device that is registered as a direct management target is different from a number for specifying a real mediation apparatus. In the present illustrative embodiment, the mediation number of the registration device of a direct management target is, for example, a serial number of the registration device. That is, the registration device of a direct management target is actually managed without intervention of a separate mediation apparatus from the registration device but is registered on the management DB 46 as being managed via a virtual mediation apparatus specified by the serial number of the registration device, in the present illustrative embodiment.

The serial number is an inherent number allotted to each device for specifying the device. The serial number may be, for example, a MAC address or a specific number. In FIG. 3, a serial number "1111A" indicates the second device 51, a serial number "1111B" indicates the second device 52, a serial number "1111C" indicates the second device 53, a serial number "1111D" indicates the first device 54, and a serial number "1111E" indicates the first device 55.

In the management DB 46, instead of the serial number or in addition to the serial number, other information (for example, a model name) capable of specifying a registration device may also be registered. In the management DB 46, information other than the information may also be registered. In the present illustrative embodiment, in the management DB 46, the status information and the action information are registered for each of the registration devices. However, the status information and the action information may also be registered or stored separately from the management DB 46.

Figure 8:
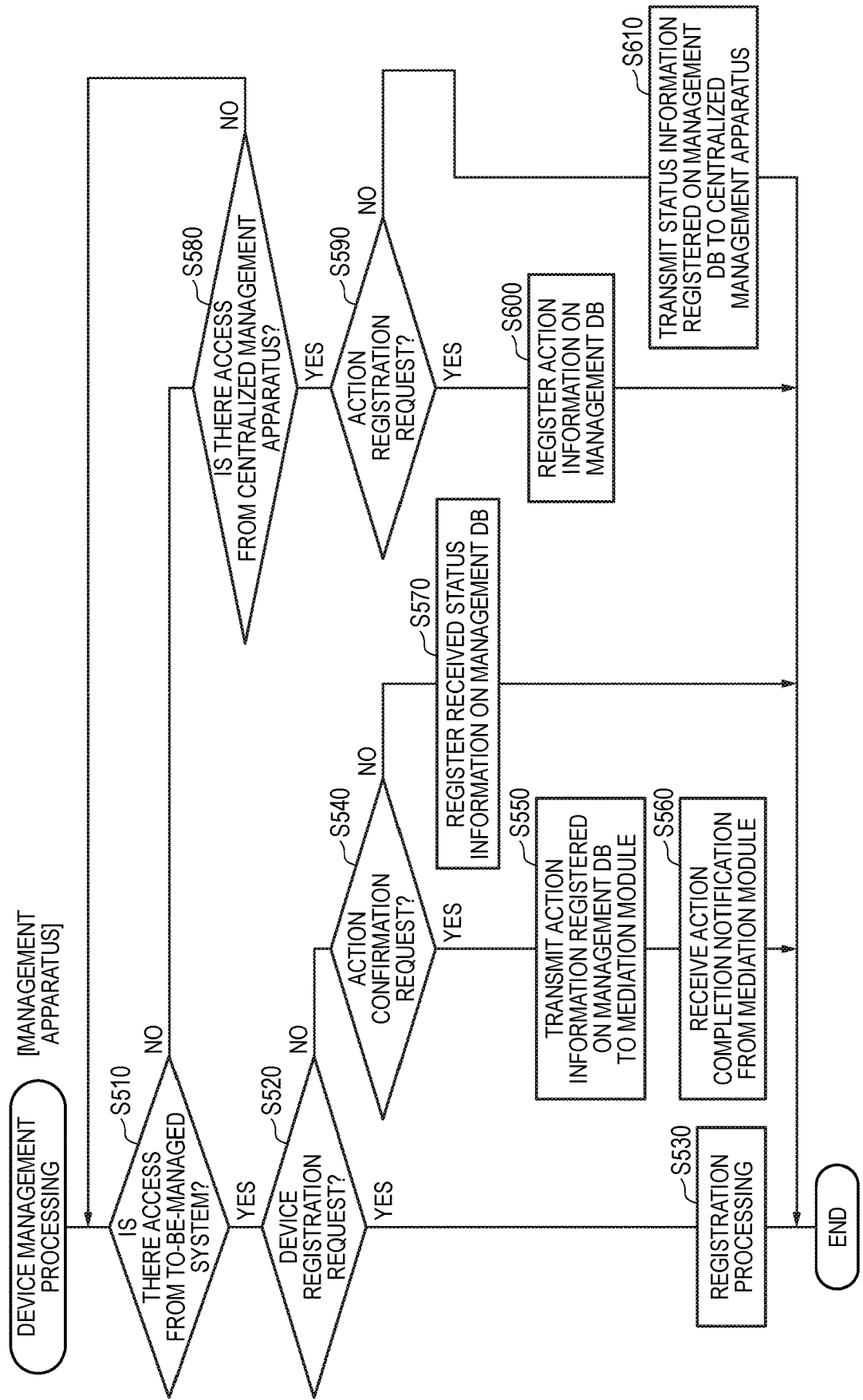
FIG. 8 is a flowchart depicting device management processing of the first illustrative embodiment.

The device management program 45 includes a variety of processing for managing the registration device and mediating the management of the registration device by the centralized management apparatus 5. Device management processing shown in FIG. 8 is included in the device management program 45. The management DB 46 is updated as appropriate as the device management program 45 is executed.

Hereinbelow, for convenience of descriptions, the controller 41 configured to execute the device management program 45 is referred to as "management module". Also, in descriptions below, the controller 41 configured to execute the diverse programs such as the OS 43 and the Web server 44 may also be simply referred to as a program name. For example, the description "the Web server 44 is" may also mean "the controller 41 configured to execute the Web server 44 is".

In the storage 42, a program of the firewall is also stored. The management module is configured to manage the registration devices by performing communication with the centralized management apparatus 5 and each of the to-be-managed systems 100 and 120 while cooperating with the other software modules such as the OS 43, the Web server 44, the firewall and the like, as appropriate. For example, the management module receives data of HTTP (Hypertext Transfer Protocol) transmitted from the to-be-managed systems 100 and 120, via the firewall and the Web server 44.

The device management program 45 may also be provided with being pre-installed in the device management apparatus 40. Also, for example, the device management program 45 may be provided with being stored in a storage medium such as a CD-ROM, a DVD-ROM, a USB memory, a flash memory and the like, for example, and may be installed in the device management apparatus 40 by reading the device management program 45 from the storage medium of the device management apparatus 40. Also, for example, the device management program 45 may be downloaded and installed in the device management apparatus 40 via an Internet communication line.

The user I/F 47 includes an input device such as a keyboard and a mouse for receiving a variety of inputs of the administrator. The user I/F 47 further includes, for example, a display device such as a liquid crystal panel and an LED display device for displaying a variety of information for the administrator.

The communication I/F 48 is an interface for communicating with the centralized management apparatus 5, each of the to-be-managed systems 100 and 120, and the like. The communication I/F 48 may also be, for example, an interface of a wired LAN, a wireless LAN, and other diverse communications. In the present illustrative embodiment, the communication I/F 48 is connected to the global network 200.

(1-3) Configuration of Mediation Apparatus

In the present illustrative embodiment, the first mediation apparatus 10, and the second mediation apparatus in the second to-be-managed system 120 have the same configuration. Therefore, hereinbelow, the first mediation apparatus 10 is described. As shown in FIG. 1, the first mediation apparatus 10 includes a controller 11, a storage 12, a user I/F 17, and a communication I/F 18.

The controller 11 includes, for example, a CPU. The storage 12 includes a semiconductor memory such as a ROM, a RAM, an NVRAM, a flash memory, an SSD and the like, for example. That is, the first mediation apparatus 10 includes a computer including the CPU and the semiconductor memory. The storage 12 may also have a memory such as a hard disk drive different from the semiconductor memory, for example. In the storage 12, a variety of programs including an operating system 13, a mediation program 14 and the association device list, data and the like are stored.

The controller 11 is configured to execute a program stored in a non-transitory tangible recording medium, thereby implementing diverse functions. In the present illustrative embodiment, the storage 12 corresponds to a non-transitory tangible recording medium having a program stored thereon. Note that, the present disclosure is not limited to the configuration where the diverse functions are implemented by the execution of the controller 11 are implemented by the execution of the program. For example, some or all of the functions may also be implemented by one or more hardware.

The association device list includes information for specifying the registration devices associated with the first mediation apparatus 10. In the present illustrative embodiment, the association device list includes, for example, the serial numbers of the associated registration devices.

Figure 5:
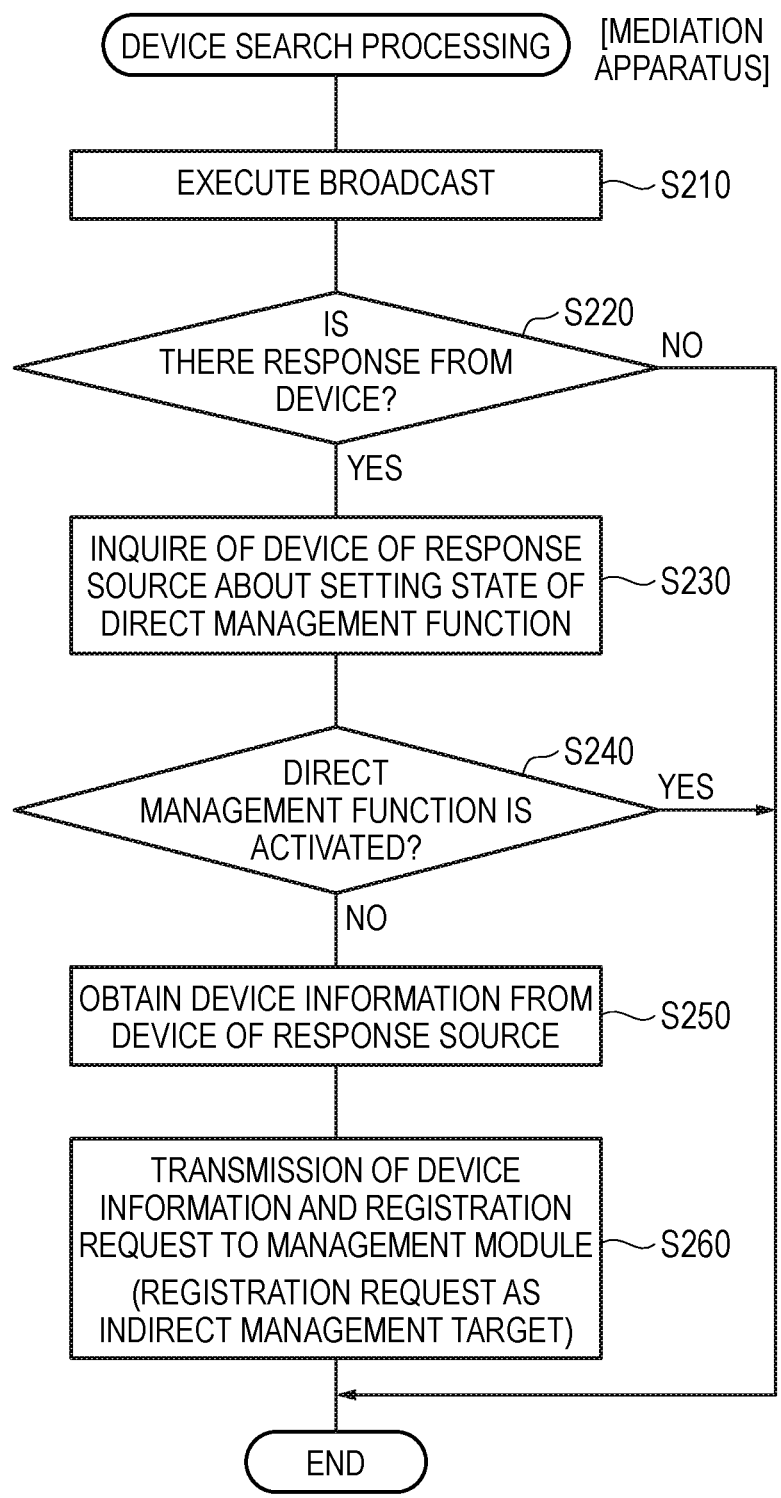
FIG. 5 is a flowchart depicting device search processing of a first illustrative embodiment.
Figure 6:
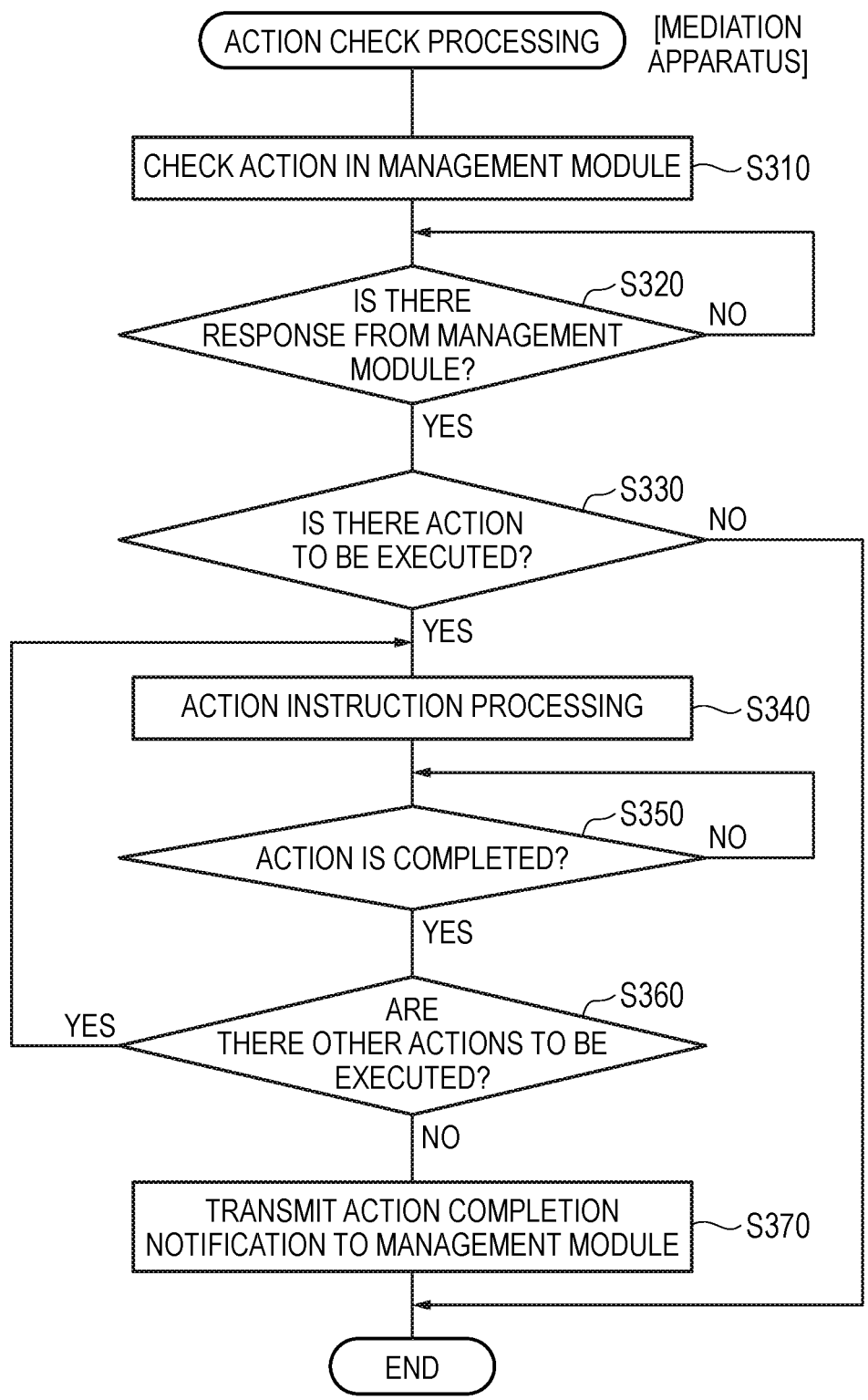
FIG. 6 is a flowchart depicting action check processing of the illustrative embodiment.
Figure 7:
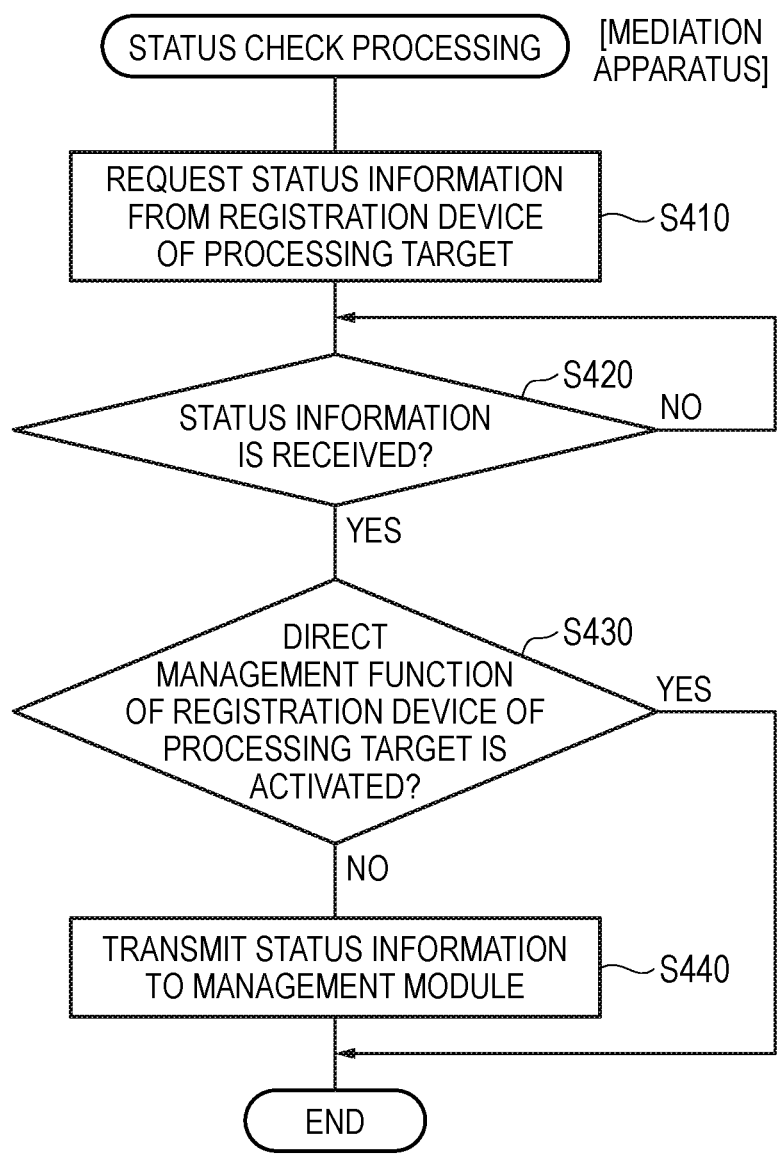
FIG. 7 is a flowchart depicting status check processing of the illustrative embodiment.

The mediation program 14 includes a variety of processing for mediating management of the registration device of an indirect management target by the centralized management apparatus 5 or the device management apparatus 40. The processing shown in FIGS. 5 to 7 is included in the mediation program 14. Hereinbelow, for convenience of descriptions, the controller 11 configured to execute the mediation program 14 is referred to as "mediation module".

The mediation program 14 may also be provided with being pre-installed in the first mediation apparatus 10. Also, for example, the mediation program 14 may be provided with being stored in a storage medium such as a CD-ROM, a DVD-ROM, a USB memory, a flash memory and the like, for example, and may be installed in the first mediation apparatus 10 by reading the mediation program 14 from the storage medium. Also, for example, the mediation program 14 may be downloaded and installed in the first mediation apparatus 10 via an Internet communication line.

The user I/F 17 includes an input device such as a keyboard and a mouse for receiving a variety of inputs of the administrator. The user I/F 17 further includes, for example, a liquid crystal panel and an LED display device.

The communication I/F 18 is an interface for communicating with the device management apparatus 40, each of the devices 51 to 55, and the like. The communication I/F 18 may also have, for example, an interface of a wired LAN, a wireless LAN, Bluetooth, USB, and other diverse communications. The first mediation apparatus 10 is configured to communicate with each apparatus connected to the global network 200, including the device management apparatus 40, via the firewall of the first relay apparatus 110.

(1-4) Configuration of Device

Figure 2A:
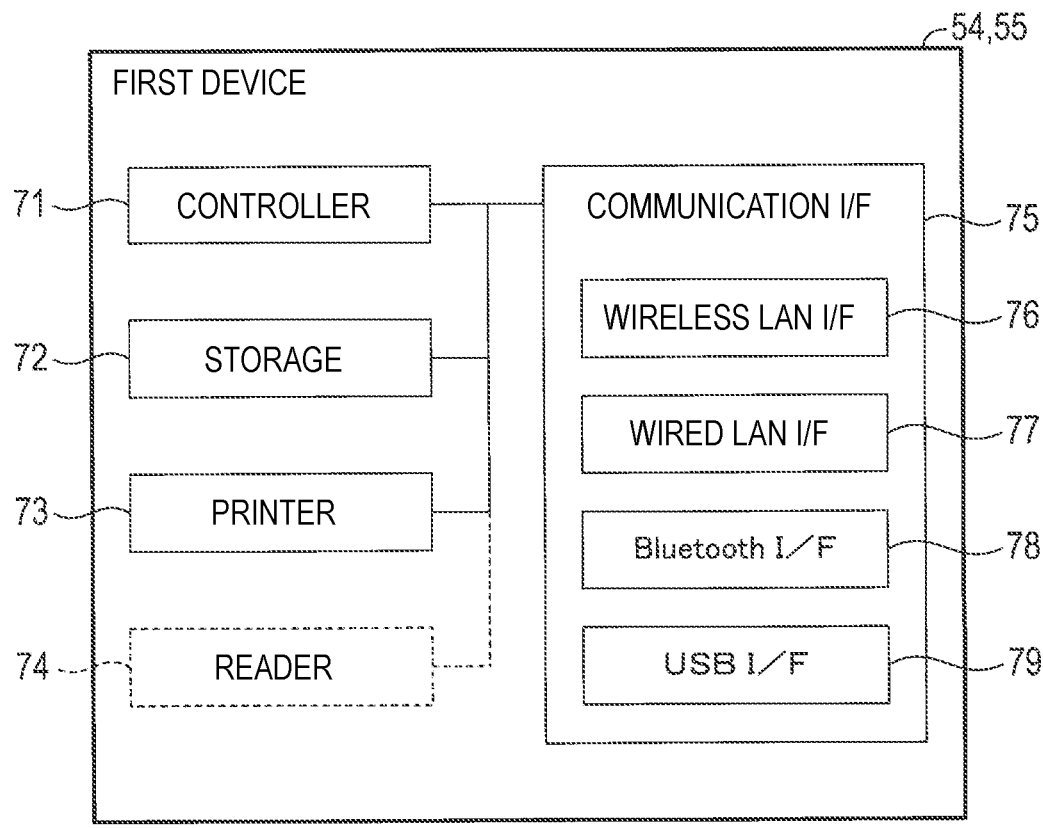
FIG. 2A depicts a schematic configuration of a first device.

Subsequently, a configuration of each of the devices 51 to 55 is described. As shown in FIG. 2A, each of the first devices 54 and 55 includes a controller 71, a storage 72, a printer 73, and a communication I/F 75. The first device 55 further includes a reader 74.

The controller 71 includes, for example, a CPU. The storage 72 includes a semiconductor memory such as a ROM, a RAM, an NVRAM, a flash memory, an SSD and the like, for example. That is, the first devices 54 and 55 each include a computer including the CPU and the semiconductor memory. The storage 72 may also have a memory such as a hard disk drive different from the semiconductor memory, for example. In the storage 72, a variety of programs, data and the like are stored.

The printer 73 is configured to implement the above-described printer function. The reader 74 is configured to implement the above-described scan function. The storage 72 includes a program for implementing the printer function by controlling the printer 73, and a program for implementing the scan function by controlling the reader 74. In the storage 72, an IP address, a serial number, a node name, a model name and the like are further stored. In the storage 72, a program of initial setup processing shown in FIG. 0.4 is further stored. The initial setup processing is processing for registering a device as a direct management target.

Figure 4:
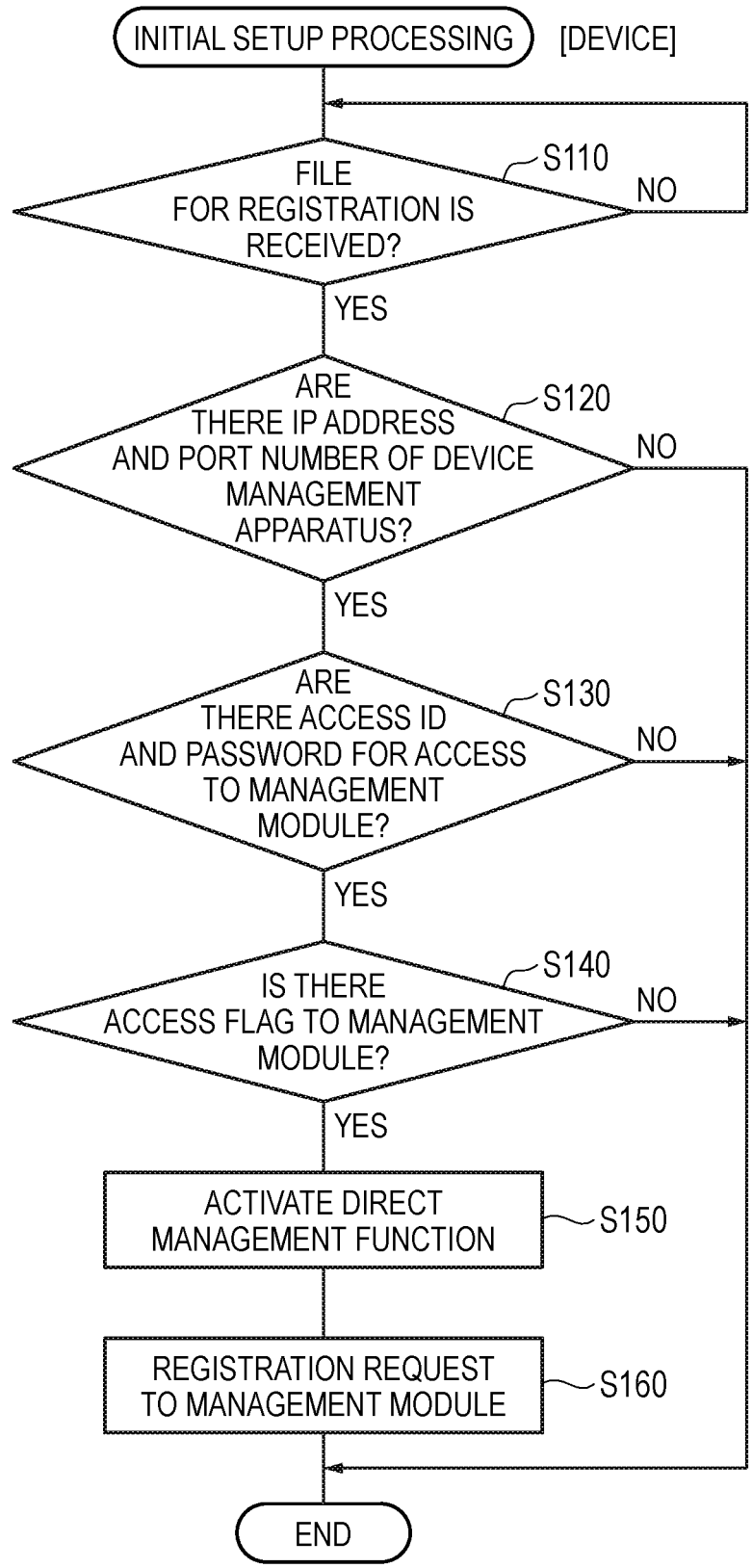
FIG. 4 depicts initial setup processing of the illustrative embodiment.

In the storage 72, direct management information indicating whether the direct management function is activated is further stored. A state where the direct management function is activated means that a device is registered as a device of a direct management target. A state where the direct management function is inactivated means that a device is registered as a device of an indirect management target or is not registered yet as a management target. That is, it can be said that the direct management information is information indicating whether a device is registered as a direct management target. The direct management information indicates, as a default, that the direct management function is inactivated, for example. The direct management function is activated when the initial setup processing shown in FIG. 4 is executed.

The communication I/F 75 is an interface for communicating with the device management apparatus 40 and the first mediation apparatus 10. The communication I/F 75 includes, for example, a wireless LAN I/F 76 for communication by a wireless LAN, a wired LAN I/F 77 for communication by a wired LAN, a Bluetooth I/F 78 for communication by Bluetooth, and a USB I/F 79 for communication by a USB. In the present illustrative embodiment, each of the first devices 54 and 55 is configured to communicate with the first mediation apparatus 10 and the device management apparatus 40 via the wireless LAN I/F 76, for example. Note that, each of the first devices 54 and 55 may also be configured to communicate with the first mediation apparatus 10 and the device management apparatus 40 via any communication I/F.

Figure 2B:
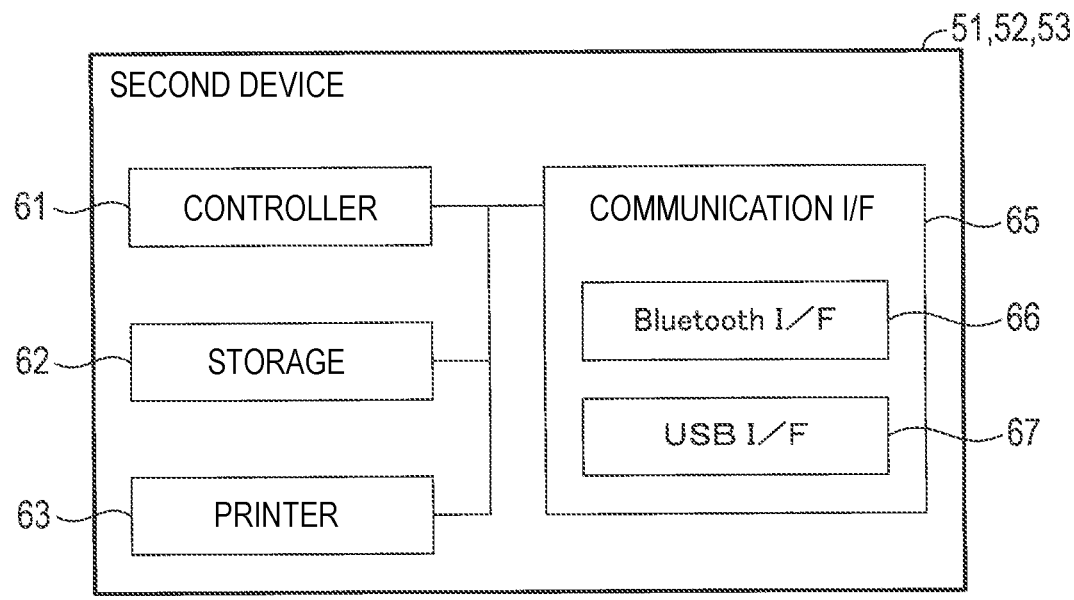
FIG. 2B depicts a schematic configuration of a second device.

As shown in FIG. 2B, each of the second devices 51, 52 and 53 includes a controller 61, a storage 62, a printer 63, and a communication I/F 65. The controller 61 is configured in a similar manner to the controller 71, for example. The storage 62 is configured in a similar manner to the storage 72, for example. The printer 63 is configured in a similar manner to the printer 73, for example.

The communication I/F 65 is an interface for communicating with the first mediation apparatus 10. The communication I/F 65 includes, for example, a Bluetooth I/F 66, and a USB I/F 67.

In the present illustrative embodiment, for simplification of descriptions, the second devices 51, 52 and 53 have been described as having the same configuration. However, at least one of the second devices 51, 52 and 53 may be different from the others or the second devices 51, 52 and 53 may be different from one another. The first devices 54 and 55 may also be different from each other.

(1-5) Initial Setup Processing in First Device

Initial setup processing for registering the first devices 54 and 55 capable of communicating with the device management apparatus 40, as the direct management target, is described with reference to FIG. 4. Herein, as an example, a case where the initial setup processing is executed in the first device 54 is described.

When activated, the controller 71 of the first device 54 starts the initial setup processing. When the initial setup processing starts, the controller 71 determines whether a file for registration is received, in S110.

The file for registration may be, for example, a bin file. The file for registration includes a variety of information for registration for registering the first device 54 as the direct management target. The information for registration includes, for example, an IP address of the device management apparatus 40, a port number of the management module in the device management apparatus 40, an access ID and a password for access to the management module, an access flag to the management module, and the like. The file for registration is transmitted from a separate apparatus from the first device 54 to the first device 54, for example. The file for registration may be received via any communication I/F.

While the file for registration is not received, the controller 71 repeats the processing of S110. Alternatively, when the file for registration is not received, the controller 71 may once end the initial setup processing and resume the initial setup processing after predetermined elapses.

When it is determined that the file for registration is received, the flow proceeds to S120. In S120, it is determined whether the IP address of the device management apparatus 40 and the port number of the management module are included in the received file for registration. When it is determined that any one is not included, the controller 71 ends the initial setup processing. When it is determined that the IP address of the device management apparatus 40 and the port number of the management module are included, the flow proceeds to S130.

In S130, the controller 71 determines whether the access ID and the password are included in the file for registration. When it is determined that either the access ID or the password is not included, the controller 71 ends the initial setup processing. When it is determined that the access ID and the password are included, the flow proceeds to S140.

In S140, the controller 71 determines whether the access flag is included in the file for registration. The access flag is for requesting the first device 54 to access the device management apparatus 40. In other words, the access flag is a flag for registering the first device 54 as a registration device of a direct management target.

When it is determined that the access flag is not included in the file for registration, the controller 71 ends the initial setup processing. When it is determined that the access flag is included in the file for registration, the flow proceeds to S150. In S150, the controller 71 activates the direct management function of the first device 54. Specifically, the controller 71 sets the direct management information stored in the storage 72 to a content indicating that the direct management function is activated.

In S160, the controller 71 requests the management module of the device management apparatus 40 to register the first device as the direct management target. This request includes transmitting device information of the first device 54 to the management module. The device information is information necessary to register the first device 54 on the device management apparatus 40, as a management device. The device information may any information. In the present illustrative embodiment, the device information includes, for example, an IP address, a serial number and a node name of the device. The device information may also include the mediation number.

By the processing of S160, the first device 54 is registered as a registration device of a direct management target in processing of S530 (FIG. 8) in the management module, which will be described later. Thereby, the first device 54 functions as a registration device of a direct management target. Specifically, the first device 54 transmits a variety of information of the first device 54 including the setup information to the device management apparatus 40 or executes an action, in response to registration of the action for the first device 54 on the device management apparatus 40.

(1-6) Diverse Processing in First Mediation Apparatus

Subsequently, device search processing, action check processing and status check processing that are executed by the controller 11 of the first mediation apparatus 10 are executed with reference to FIGS. 5 to 7. In the device search processing, the controller 11 searches for a device that is to be registered as the indirect management target. In the action check processing, the controller 11 checks whether an action is registered for each registration device of an indirect management target in the first to-be-managed system 100, and causes the corresponding registration device to execute the action when the action is registered. In the status check processing, the controller 11 obtains the status information from each registration device of an indirect management target in the first to-be-managed system and transmits the status information to the device management apparatus 40. These three processing is processing as the mediation module. Hereinbelow, each processing is specifically described.

(1-6-1) Device Search Processing

The controller 11 of the first mediation apparatus 10 executes device search processing shown in FIG. 5 at a specific search execution timing. The search execution timing may be any timing. In the present illustrative embodiment, the search execution timing arrives periodically with 60 minutes as one cycle, for example. The search execution timing may be changed in the first mediation apparatus 10 or from the device management apparatus 40.

When the device search processing starts, the controller 11 executes broadcast in S210. The broadcast may be performed by any communication method. For example, the broadcast may be performed by the wireless LAN. The broadcast may also be performed by a plurality of different communication methods.

In S220, the controller 11 determines whether response data to the broadcast is received from the device. When the device configured to receive the broadcast data from the first mediation apparatus 10 receives the broadcast data, the device transmits the response data. In the present illustrative embodiment, for example, the broadcast is performed using SNMP (Simple Network Management Protocol) at least by the wireless LAN. For this reason, both the first devices 54 and 55 can receive the broadcast data, and transmit the response data when the broadcast data is received. The response data includes, for example, information such as a model name and a serial number capable of specifying a device of a response source and enabling access to the device of a response source in processing of S230 that will be described later.

When it is determined in S220 that the response data is not received, the controller 11 ends the device search processing. When it is determined that the response data is received, the flow proceeds to S230. Processing of S230 and thereafter is individually executed for each of transmission sources of the response data. That is, for example, when the response data is received from both the first devices 54 and 55, the processing of S230 and thereafter is individually executed for each of the two devices. Herein, for simplification of descriptions, it is assumed that the response data is received from the first device 54.

In S230, the controller 11 inquires of the device of a response source (herein, the first device 54) about a setting state of the direct management function, i.e., whether the direct management function is activated. The device that can respond to the broadcast transmits the direct management information indicative of a setting state of the direct management function, in response to the inquiry of S230. In S230, the controller 11 receives the transmitted direct management information.

In S240, the controller 11 determines whether the direct management function is activated in the device of a response source, i.e., whether the device of a response source is registered as the direct management target, based on a result of the inquiry of S230, i.e., based on the received direct management information. In a case where the direct management function is inactivated, the flow proceeds to S250.

In S250, the controller 11 obtains device information from the device of a response source. The device information obtained herein is information necessary to register the device on the device management apparatus 40, as the indirect management target, and includes, for example, an IP address, a serial number and a node name of the response source device. Note that, the controller 11 may not obtain in S250 the information, which is included in the response data to the broadcast of S210, of the device information to be obtained, and may use the information in the response data. Alternatively, the controller 11 may also newly obtain the information included in the response data, in S250.

In S260, the controller 11 transmits the device information, which is obtained from the device of a response source in S250, to the management module of the device management apparatus 40, and requests the management module to register the device as the indirect management target. In S260, further, the controller 11 transmits mediation apparatus information, which indicates that the mediation apparatus of a request source is the first mediation apparatus 10. The mediation apparatus information may be, for example, the mediation number. In S260, further, the controller 11 registers the device information of the device of a response source on the association device list stored in the storage 12. Thereby, the mediation module itself can also recognize the response source device, as the indirect management target. By the processing of S260, the device of a response source is registered as the registration device of an indirect management target in processing of S530 (FIG. 8) in the management module, which will be described later. Thereby, the device of a response source functions as a registration device of an indirect management target. Specifically, the device of a response source transmits the status information to the mediation module, in response to an instruction from the mediation module, or executes an action, in response to an instruction from the mediation module.

When it is determined in S240 that the direct management function is activated in the device of a response source, the controller 11 ends the device search processing for the device. That is, a state where the direct management function is activated means that the device is a registration device registered already as the direct management target. Nevertheless, if the processing of S250 and S260 is executed for such registration device for registration as the indirect management target, the registration device is registered not only as a direct management target but also as an indirect management target. In this case, the device management apparatus 40 manages the registration device not only directly without intervention of the first mediation apparatus 10 but also via the first mediation apparatus 10. Such double management may cause useless processing and useless resource consumption in each site of the device management system 1.

Therefore, in the present illustrative embodiment, it is checked whether the direct management function is activated for each of the devices that respond to the broadcast, and the processing of S250 and thereafter is not executed for the device in which the direct management function is activated, so as to suppress double registration.

(1-6-2) Action Check Processing

The controller 11 of the first mediation apparatus 10 executes action check processing shown in FIG. 6 at a specific first check timing. The first check timing may be any timing. In the present illustrative embodiment, the first check timing arrives periodically with 30 seconds as one cycle, for example. The first check timing may be changed in the first mediation apparatus 10 or from the device management apparatus 40.

When the action check processing starts, the controller 11 checks whether there is an action in the management module, in S310. Specifically, the controller 11 individually checks whether there is an action, for each of the registration devices registered on the association device list of the first mediation apparatus 10, i.e., for each registration device of an indirect management target in the first to-be-managed system 100. In S310, actually, the controller 11 individually inquires of each registration device of an indirect management target whether there is an action, and receives a response to the inquiry from the management module. In a case where an action is registered, action information indicative of the action is also included in the response from the management module.

In S320, the controller 11 determines whether a response to the processing of S310 is received from the management module. Note that, processing of S320 and thereafter is also individually performed for each registration device of an indirect management target. The controller 11 repeats the determination of S320 until a response is received from the management module. When a response is received from the management module, the flow proceeds to S330.

In S330, the controller 11 determines whether there is an action to be executed, based on the response from the management module. When it is determined that there is no action to be executed, the controller 11 ends the action check processing for the corresponding registered module. When it is determined that there is an action to be executed, the flow proceeds to S340. In S340, the controller 11 executes action instruction processing. Specifically, the controller 11 instructs the corresponding registration device to execute one of actions included in the action information.

In S350, the controller 11 determines whether the instructed action is over in the registration device. The determination as to whether the action is over in the registration device can be performed by diverse methods. For example, an ending notification may be transmitted from the registration device when an action is over, and it may be determined that the action is over, based on the ending notification.

The controller 11 repeats the determination of S350 until the instructed action is over. When the instructed action is over, the flow proceeds to S360. In S360, the controller 11 determines whether there are other actions to be executed, for the same registration device. When it is determined that there are other actions to be executed, the flow proceeds to S340. In this case, in S340, the processing of S340 and S350 is executed for one of the remaining actions, in the similar manner to described above.

When it is determined in S360 that there is no other action to be executed, the flow proceeds to S370. In S370, the controller 11 transmits an action completion notification to the management module. The action completion notification includes information indicative of the registration device having completed the execution of actions. The management module receives the action completion notification and recognizes that the actions registered for the corresponding registration device have been completed.

In a case where there are other registration devices for which actions are registered, the processing of S330 to S370 is executed for each of the other registration devices. Note that, the registration device of a direct management target also executes the action check processing or similar processing. That is, for example, in a case where the first device 54 is registered as a direct management target, the controller 71 of the first device 54 checks whether there is an action for the first device 54 by executing processing that is substantially equivalent to the action check processing shown in FIG. 6. When it is checked that an action is registered, the action is executed.

(1-6-3) Status Check Processing

The controller 11 of the first mediation apparatus 10 executes status check processing shown in FIG. 7 at a specific second check timing. The second check timing may be any timing. In the present illustrative embodiment, the second check timing arrives periodically with 30 minutes as one cycle, for example. The second check timing may be changed in the first mediation apparatus 10 or from the device management apparatus 40.

The controller 11 individually executes the status check processing for each registration device of an indirect management target, i.e., for each device registered on the association device list. When the status check processing starts, the controller 11 requests the status information from the registration device of a processing target, in S410. In S420, the controller 11 determines whether the status information is received from the registration device of a processing target. The controller 11 repeats the determination of S420 until the status information is received. When it is determined that the status information is received, the flow proceeds to S430.

In S430, the controller 11 determines whether the direct management function is activated in the registration device of a processing target. When the direct management function is activated, since the corresponding registration device is a registration device of a direct management target and the mediation module is not required to be involved in the management, the controller 11 ends the status check processing. When it is determined that the direct management function is inactivated, the flow proceeds to S440.

In S440, the controller 11 transmits the status information received in S420 to the management module, together with the information indicative of the corresponding registration device.

In S410, the controller 11 may request the status information from all the devices in the first to-be-managed system 100. Also, when a request destination of the status information in S410 is limited to a registration device of an indirect management target, the processing of S430 may be omitted.

Note that, the registration device of a direct management target also executes the status check processing or similar processing. That is, for example, in a case where the first device 54 is registered as a direct management target, the controller 71 of the first device 54 transmits the status information of the first device 54 to the management module by executing processing that is substantially equivalent to the status check processing shown in FIG. 7.

(1-7) Device Management Processing in Device Management Apparatus

Subsequently, device management processing that is executed by the controller 41 of the device management apparatus 40, i.e., processing as the management module is described with reference to FIG. 8. When activated, the controller 41 (i.e., the management module) starts the device management processing.

When the device management processing starts, the controller 41 determines whether there is an access from any one of the to-be-managed systems, in S510. When it is determined that there is no access from any one of the to-be-managed systems, the flow proceeds to S580.

In S580, the controller 41 determines whether there is an access from the centralized management apparatus 5. When it is determined that there is no access from the centralized management apparatus 5, the flow proceeds to S510. When it is determined that there is an access from the centralized management apparatus 5, the flow proceeds to S590.

In S590, the controller 41 determines whether a specific content of the access from the centralized management apparatus 5 is an action registration request. When it is determined that the specific content is an action registration request, the flow proceeds to S600. In S600, the controller 41 registers action information indicative of the requested action on the management DB 46. Specifically, the controller 41 registers the action information on the management DB 46, in association with a registration device that is a request target of the action.

When it is determined in S590 that the specific content of the access from the centralized management apparatus 5 is not an action registration request, the flow proceeds to S610 because the specific content of the access is a request of the status information, in the present illustrative embodiment. In S610, the controller 41 transmits the status information registered on the management DB 46 to the centralized management apparatus 5. In S610, the status information of all the registration devices may be transmitted. However, the centralized management apparatus 5 can request the status information with designating one or more specific registration devices. Therefore, when one or more specific registration devices are designated, the status information of the designated registration devices may be transmitted in S610.

When it is determined in S510 that there is an access from any one of the to-be-managed systems, the flow proceeds to S520. In S520, the controller 41 determines whether a specific content of the access from the to-be-managed system is a device registration request, i.e., whether the specific content is a request to register a device as a management target. The device registration request indicates the registration request in the above-described processing of S160 and S260.

When it is determined that the specific content of the access from the to-be-managed system is the device registration request, the flow proceeds to S530. Note that, the device registration request may be a registration request as an indirect management target from the mediation apparatus and may also be a registration request as a direct management target from the first device.

In S530, the controller 41 executes registration processing. Specifically, in a case where the device registration request includes a mediation number indicative of a specific mediation apparatus, a device of a registration target is registered on the management DB 46, as an indirect management target. In a case where the device registration request does not include the mediation number or includes a serial number as the mediation number, a device of a registration target is registered on the management DB 46, as a direct management target.

When it is determined in S520 that the specific content of the access from the to-be-managed system is not a device registration request, the flow proceeds S540. In S540, the controller 41 determines whether the specific content of the access is an action confirmation request. The action confirmation request indicates an inquiry from the mediation apparatus in the above-described processing of S310 and an inquiry equivalent to the processing of S310 from the registration device of a direct management target.

When it is determined that the specific content of the access from the to-be-managed system is an action confirmation request, the flow proceeds to S550. In S550, the controller 41 transmits the action information registered for the registration device of a request target on the management DB 46 to the mediation module. The action information transmitted herein is received in the mediation module in the above-described processing of S320.

In S560, the controller 41 receives the action completion notification transmitted from the mediation module in the above-described processing of S370.

Note that, in S550, in a case where an action is not registered for the registration device of a request target, the controller 41 transmits information indicating that an action is not registered to the mediation module. In this case, the controller 41 ends the device management processing without executing the processing of S560.

When it is determined in S540 that the specific content of the access from the to-be-managed system is not an action confirmation request, the specific content of the access is reception of the status information transmitted in the above-described processing of S440, in the present illustrative embodiment. In this case, the flow proceeds to S570 where the controller 41 registers the received status information as the status information of the corresponding registration device on the management DB 46. In a case where the status information is already registered, the status information is updated by the status information received this time.

(1-8) Advantages of First Illustrative Embodiment

In the first illustrative embodiment described above, in the first mediation apparatus 10, the mediation module checks whether each of the devices, which respond to the broadcast, is already registered as the direct management target (S240). For the registration device already registered as the direct management target, the registration request as the indirect management target is not performed (S240: YES). For this reason, the registration device already registered as the direct management target is suppressed from being further registered as the indirect management target.

The double registration as the direct management target and the indirect management target is suppressed, so that processing load and waste of resources (for example, a storage capacity of data necessary for management) in the device management apparatus 40 can also be suppressed. Also in the first mediation apparatus 10, the device already registered as the direct management target is suppressed from being managed via the first mediation apparatus 10. For this reason, processing load and waste of resources for management in the first mediation apparatus 10 are suppressed.

Note that, in the first illustrative embodiment, the management apparatus 40 corresponds to an example of the device management apparatus. Both the first mediation apparatus 10 and the second mediation apparatus correspond to examples of the mediation apparatus. Each of the printers 63 and 73 corresponds to an example of the image recorder. The reader 74 corresponds to an example of the image reader. The communication method that is used for the Internet, i.e., the communication protocol including TCP/IP corresponds to an example of the first communication method. The wireless LAN that is a communication method used for the first local network in the first to-be-managed system 100 corresponds to an example of the second communication method. Each of Bluetooth and USB, which are communication methods used for communication with the first mediation apparatus 10 and the second devices 51, 52 and 53, corresponds to an example of the third communication method. The direct management information corresponds to an example of the registration related information. The IP address, the serial number, and/or the node name included in the device information correspond to an example of the device specifying information.

The processing of S210 corresponds to an example of the broadcast processing. The processing of S220 corresponds to an example of the response receiving processing. The processing of S230 corresponds to an example of the related information obtaining processing. The processing of S240 corresponds to an example of the registration determination processing. The processing of S250 corresponds to an example of the specific information obtaining processing. The processing of S260 corresponds to an example of the registration request processing. The processing of S520 corresponds to an example of the request obtaining processing. The processing of S530 corresponds to an example of the storing processing and the registration processing.

2. Second Illustrative Embodiment

Since basic configurations of a second illustrative embodiment are similar to those of the first illustrative embodiment, differences are hereinbelow described. Note that, the same reference signs as the first illustrative embodiment indicate the same configurations, and the preceding descriptions are referred to.

The second illustrative embodiment is partially different from the first illustrative embodiment, in terms of contents of the device search processing that is executed by the controller of the first mediation apparatus 10 and contents of the device management processing that is executed by the device management apparatus 40.

Figure 9:
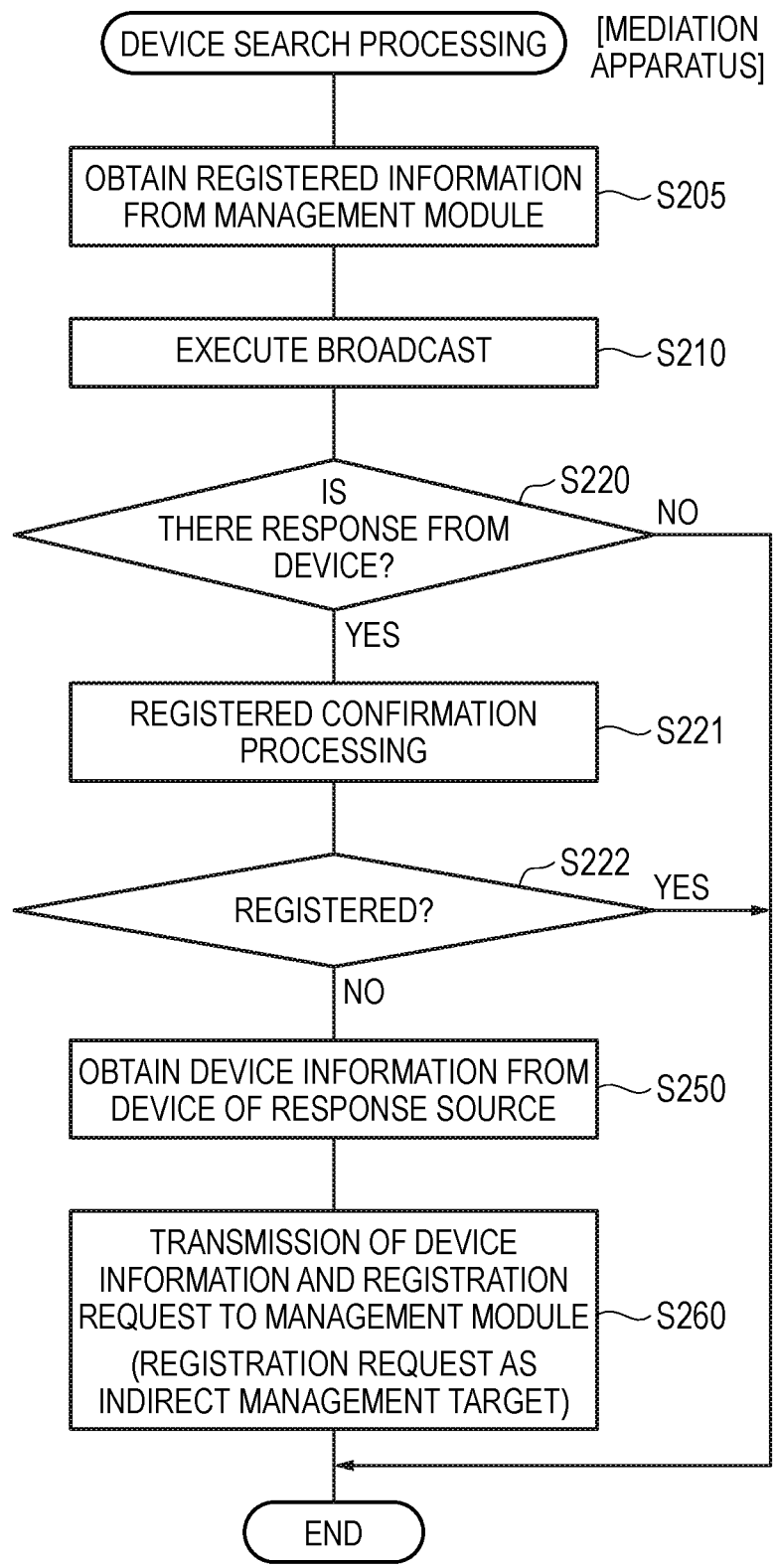
FIG. 9 is a flowchart depicting device search processing of a second illustrative embodiment.

The device search processing of the second illustrative embodiment is described with reference to FIG. 9. When the device search processing of FIG. 9 starts, the controller 11 of the first mediation apparatus 10 obtains registered information from the management module, in S205. Specifically, the controller 11 obtains the registered information by transmitting a registered information request to the management module.

The registered information indicates the registration devices registered on the management DB 46 of the device management apparatus 40. That is, the registered information includes both the registration device registered as a direct management target and the registration device registered as an indirect management target. The registered information may be some or all of the management DB 46, for example.

The processing of S210 and S220 is similar to FIG. 5. In S220, when the response data is received, the flow proceeds to S221. In S221, the controller 11 executes registered confirmation processing. Specifically, the controller 11 determines whether the device of a transmission source of the response data is included in the registered information obtained in S205, i.e., whether the device of a transmission source of the response data is already registered as a registration device.

Based on the processing result of S221, the controller 11 determines whether the device of a transmission source of the response data is already registered as a registration device, in S222. When it is determined that the device of a transmission source of the response data is already registered, the controller 11 ends the device search processing without requesting the management module to register the device.

When it is determined that the device of a transmission source of the response data is not registered yet on the management DB 46, the flow proceeds to processing of S250 and thereafter. The processing of S250 and S260 is similar to FIG. 5.

Figure 10:
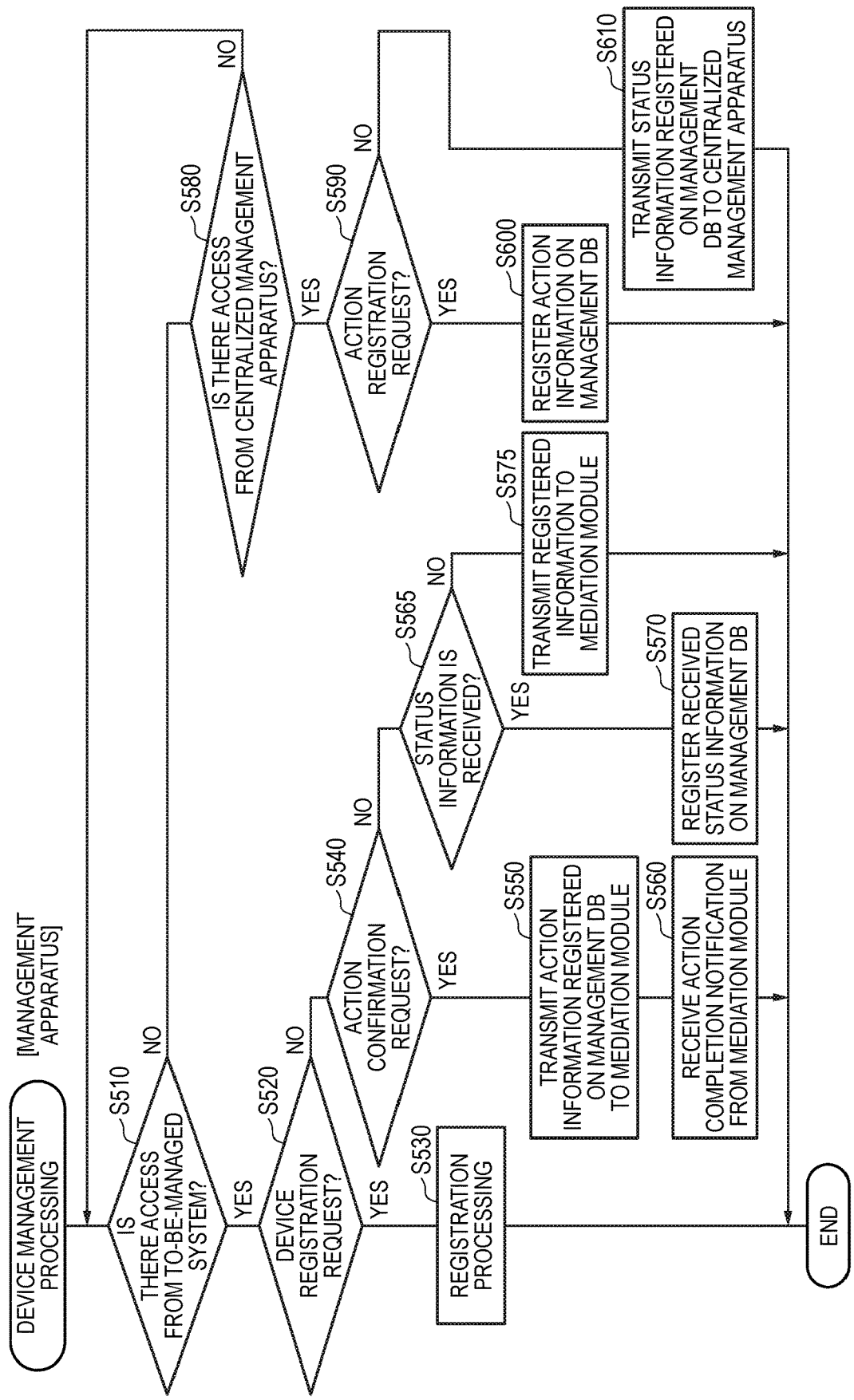
FIG. 10 is a flowchart depicting device management processing of the second illustrative embodiment.

Subsequently, the device management processing of the second illustrative embodiment is described with reference to FIG. 10. The device management processing of FIG. 10 is different from the device management processing of FIG. 8, in terms of processing that is executed when a result of the determination in S540 is negative. That is, when it is determined in S540 that the specific content of the access from the to-be-managed system is not an action confirmation request, the flow proceeds to S565.

In S565, the controller 11 determines whether the status information of any one registration device is received from the to-be-managed system. When it is determined that the status information is received, the flow proceeds to S570 where the controller 11 registers the received status information on the management DB 46, as the status information of the corresponding registration device, similar to FIG. 8.

When it is determined in S565 that the specific content of the access from the to-be-managed system is not reception of the status information, the specific content of the access is the registered information request transmitted from the mediation module in the above-described processing of S205, in the present illustrative embodiment. In this case, the flow proceeds to S575 where the controller 11 transmits the registered information to the mediation module.

Also in the second illustrative embodiment configured as described above, it is possible to achieve the operational effects of suppressing the double management, similar to the first illustrative embodiment.

Note that, the processing of S205 corresponds to an example of the registered information obtaining processing. The processing of S220 and S221 corresponds to an example of the related information obtaining processing. The processing of S221 and S222 corresponds to an example of the registration determination processing.

3. Third Illustrative Embodiment

Since basic configurations of a third illustrative embodiment are similar to those of the first illustrative embodiment, differences are hereinbelow described. Note that, the same reference signs as the first illustrative embodiment indicate the same configurations, and the preceding descriptions are referred to.

The third illustrative embodiment is partially different from the first illustrative embodiment, in terms of contents of the device management processing that is executed by the device management apparatus 40. The device search processing of the third illustrative embodiment is described with reference to FIG. 11.

Figure 11:
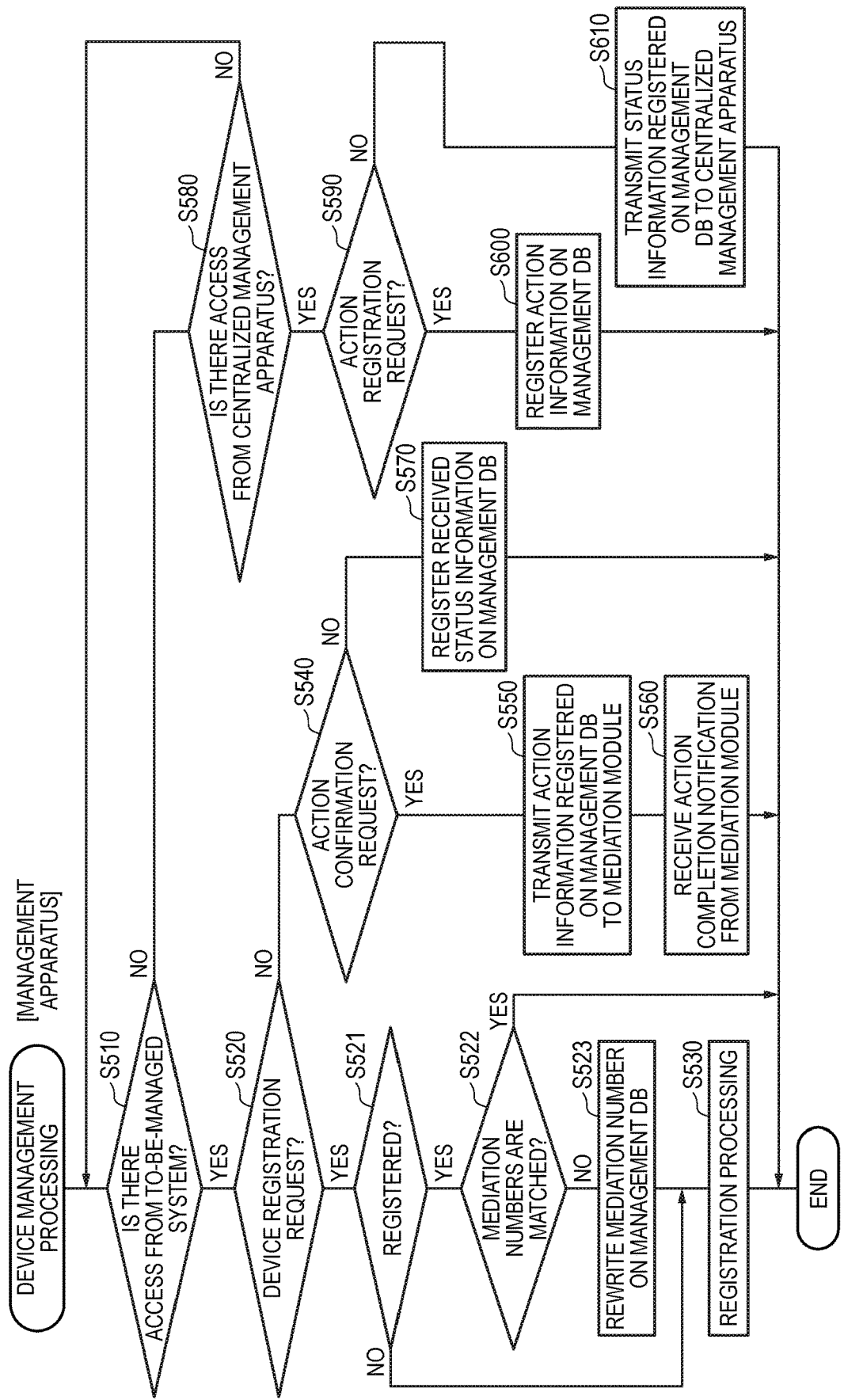
FIG. 11 is a flowchart depicting device management processing of a third illustrative embodiment.

The device management processing of FIG. 11 is different from the device management processing of FIG. 8, in terms of processing that is executed when a result of the determination in S520 is positive. That is, when it is determined in S520 that the specific content of the access from the to-be-managed system is a device registration request, the flow proceeds to S521.

In S521, the controller 41 determines whether a device (hereinbelow, referred to as "registration target device") indicated by the device registration request is already registered on the management DB 46. When it is determined that the registration target device is not registered yet, the flow proceeds to S530 where the controller 41 executes the registration processing. The processing of S530 is similar to FIG. 8.

On the other hand, when it is determined in S521 that the registration target device is already registered, the flow proceeds to S522. In S522, the controller 41 determines whether the mediation number corresponding to the registration target device on the management DB 46 coincides with the mediation number indicated in the device registration request. When it is determined that both the mediation numbers coincide with each other, the controller 41 ends the device management processing. When it is determined that both the mediation numbers do not coincide with each other, the flow proceeds to S523. The case where both do not coincide with each other includes a case where while the mediation number 1 is registered on the management DB 46, the mediation number indicated in the device registration request is the serial number of the device or vice versa.

In S523, the controller 41 rewrites the mediation number of the registration target device registered on the management DB 46 with the mediation number indicated in the device registration request received this time. That is, the registration as the direct management target is changed to the registration as the indirect management target, or vice versa.

Also in the third illustrative embodiment configured as described above, it is possible to achieve the operational effects of suppressing the double management, similar to the first illustrative embodiment.

4. Other Illustrative Embodiments

Although the illustrative embodiments of the present disclosure have been described, the present disclosure is not limited to the illustrative embodiments and can be diversely modified and implemented.

(4-1) In the device management processing of FIGS. 8 and 10, the processing of S521 to S523 in FIG. 11 may also be included between S520 and S530.

(4-2) In the device search processing of FIG. 5, all the information to be obtained in S250 may also be included in the response data to the broadcast in S210 from the device. In this case, the processing of S250 may also be omitted. The same holds true for FIG. 9.

(4-3) In the status check processing of FIG. 7, the processing of S430 may also be omitted.

(4-4) One or more of the second devices 51, 52 and 53 may also have the function of connecting to the first local network. That is, the device having the function of connecting to the first local network may also be managed via the first mediation apparatus 10. In other words, at least one of the first devices 54 and 55 can connect to the first local network but may also be managed via the first mediation apparatus 10.

(4-5) The device of the management target may have any function. That is, the device of the management target may also have a separate function from the printer function and the scan function.

(4-6) The present disclosure is not limited to application to the so-called MDM system. For example, the present disclosure can also be applied to a management system where the centralized management apparatus 5 is not provided and the device management apparatus 40 is configured to manage the device directly or via the mediation apparatus.

(4-7) The plurality of functions of one constitutional element in the illustrative embodiments may also be implemented by a plurality of constitutional elements or one function of one constitutional element may also be implemented by the plurality of constitutional elements. The plurality of functions of the plurality of constitutional elements may also be implemented by one constitutional element or one function implemented by the plurality of constitutional elements may also be implemented by one constitutional element. Some of the configurations may also be omitted. At least some of the configurations in the illustrative embodiments may also be added or replaced with respect to the other configurations in the illustrative embodiments. Note that, all aspects included in the technical spirit specified from wording defined in the claims are illustrative embodiments of the present disclosure.

As discussed above, the disclosure may provide at least the following illustrative, non-limiting aspects.

A mediation program of the present disclosure is used for a device management system. The device management system includes a management apparatus, a mediation apparatus, a first device, and a second device. The mediation apparatus can communicate with the management apparatus. The first device can communicate with the management apparatus and the mediation apparatus. The second device can communicate with the mediation apparatus.

The first device is registered on the management apparatus, as a device of a direct management target, so that the management apparatus can manage the first device by communication with the first device, without intervention of the mediation apparatus.

The first device and/or the second device is registered on the management apparatus, as a device of an indirect management target, so that the management apparatus can manage the registered first device and/or second device via the mediation apparatus.

The mediation program is for causing a computer provided for the mediation apparatus to execute related information obtaining processing, registration determination processing, and registration request processing. The related information obtaining processing includes obtaining related information about the first device from the first device.

The registration determination processing includes determining whether the first device is registered on the management apparatus as the direct management target or the indirect management target, based on the related information obtained in the related information obtaining processing.

The registration request processing includes transmitting a registration request to the management apparatus, in response to the registration determination processing determining that the first device is not registered as either the direct management target or the indirect management target. The registration request is to request the management apparatus to register the first device as the indirect management target.

According to the above configuration, the first device is suppressed from being double-registered as the direct management target and the indirect management target.

A management program of the present disclosure is used for a device management system. The device management system includes a management apparatus, a mediation apparatus, a first device, and a second device. The mediation apparatus can communicate with the management apparatus. The first device can communicate with the management apparatus and the mediation apparatus. The second device can communicate with the mediation apparatus.

The first device is registered on the management apparatus, as a device of a direct management target, so that the management apparatus can manage the first device by communication with the first device, without intervention of the mediation apparatus.

The first device and/or the second device is registered on the management apparatus, as a device of an indirect management target, so that the management apparatus can manage the registered first device and/or second device via the mediation apparatus.

The mediation apparatus is configured to obtain device specifying information from the first device. The device specifying information specifies the first device. The mediation apparatus is configured to transmit a registration request including the obtained device specifying information to the management apparatus. The registration request is to request the management apparatus to register the first device as the indirect management target.

The management program is for causing a computer provided for the management apparatus to execute storing processing, request obtaining processing, registration determination processing, and registration processing.

The storing processing includes storing registered information indicative of devices of the direct management target and the indirect management target registered on the management apparatus.

The request obtaining processing includes obtaining the registration request transmitted from the mediation apparatus.

The registration determination processing includes determining whether the first device is registered as the direct management target or the indirect management target, based on the device specifying information included in the registration request obtained in the request obtaining processing and the registered information stored in the storing processing.

The registration processing includes registering the first device as the indirect management target, in response to the registration determination processing determining that the first device is not registered as either the direct management target or the indirect management target.

Even with the above configuration, the first device is suppressed from being double-registered as the direct management target and the indirect management target.

A device management system of the present disclosure includes a management apparatus, a mediation apparatus, a first device, and a second device. The mediation apparatus can communicate with the management apparatus. The first device can communicate with the management apparatus and the mediation apparatus. The second device can communicate with the mediation apparatus.

The first device is registered on the management apparatus, as a device of a direct management target, so that the management apparatus can manage the first device by communication with the first device, without intervention of the mediation apparatus.

The first device and/or the second device is registered on the management apparatus, as a device of an indirect management target, so that the management apparatus can manage the registered first device and/or second device via the mediation apparatus.

The mediation apparatus includes a controller. The controller is configured to execute related information obtaining processing, registration determination processing, and registration request processing. The contents of each of the related information obtaining processing, the registration determination processing and the registration request processing are as described above.

According to the device management system configured in this manner, the first device is suppressed from being double-registered as the direct management target and the indirect management target, like each of the above-described programs.

What is claimed is:

1. A non-transitory computer-readable medium storing a mediation program readable by a computer of a mediation apparatus of a device management system, the device management system comprising:

a management apparatus;

the mediation apparatus configured to communicate with the management apparatus;

a first device configured to communicate with the management apparatus and the mediation apparatus; and a second device configured to communicate with the mediation apparatus, the management apparatus being configured to manage the first device registered on the management apparatus as a device of a direct management target by communication with the first device, without intervention of the mediation apparatus, the management apparatus being configured to manage the first device and/or the second device registered on the management apparatus as a device of an indirect management target via the mediation apparatus, the mediation program, when executed by the computer, causes the mediation apparatus to perform:

receiving related information about the first device from the first device;

determining whether the first device is registered on the management apparatus as the direct management target or the indirect management target, based on the received related information; and in a case it is determined that the first device is not registered as either the direct management target or the indirect management target, transmitting a registration request to the management apparatus, the registration request requesting the management apparatus to register the first device as the indirect management target.

2. The non-transitory computer-readable medium according to claim 1, wherein the mediation program causes the mediation apparatus to perform:

in the determining, determining whether the first device is registered on the management apparatus, as the direct management target, based on the received related information, and in the transmitting, in the case it is determined that the first device is not registered as the direct management target, transmitting the registration request to the management apparatus.

3. The non-transitory computer-readable medium according to claim 2, wherein the related information comprises registration related information indicating whether the first device is registered on the management apparatus as the direct management target, and wherein in the determining, the mediation program causes the mediation apparatus to perform determining whether the first device is registered as the direct management target, based on the registration related information.

4. The non-transitory computer-readable medium according to claim 1, wherein the mediation program, when executed by the computer, further causes the mediation apparatus to perform:
in a case it is determined that the first device is not registered as either the direct management target or the indirect management target, receiving device specifying information from the first device, the device specifying information specifying the first device, and wherein the registration request comprises the device specifying information.

5. The non-transitory computer-readable medium according to claim 1, wherein the management apparatus has registered information, the registered information indicating devices of the direct management target and the indirect management target registered on the management apparatus, wherein the related information comprises device specifying information, the device specifying information specifying the first device, wherein the mediation program, when executed by the computer, further causes the mediation apparatus to perform obtaining the registered information from the management apparatus, and wherein in the determining, the mediation program causes the mediation apparatus to perform determining whether the first device is registered as the direct management target or the indirect management target, based on the device specifying information and the registered information.

6. The non-transitory computer-readable medium according to claim 5, wherein the registration request comprises the device specifying information.

7. The non-transitory computer-readable medium according to claim 4, wherein the device specifying information comprises at least one of an IP address, a serial number and a node name of the first device.

8. The non-transitory computer-readable medium according to claim 5, wherein the device specifying information comprises at least one of an IP address, a serial number and a node name of the first device.

9. The non-transitory computer-readable medium according to claim 6, wherein the device specifying information comprises at least one of an IP address, a serial number and a node name of the first device.

10. The non-transitory computer-readable medium according to claim 1, wherein the mediation program, when executed by the computer, further causes the mediation apparatus to perform:
broadcasting; and
receiving a response to the broadcast from the first device, and wherein in response to receiving the response from the first device, the mediation program causes the mediation apparatus to perform receiving the related information.

11. A non-transitory computer-readable medium storing a management program readable by a computer of a management apparatus of a device management system, the device management system comprising:

the management apparatus;
a mediation apparatus configured to communicate with the management apparatus;
a first device configured to communicate with the management apparatus and the mediation apparatus; and
a second device configured to communicate with the mediation apparatus,
the management apparatus being configured to manage the first device registered on the management apparatus as a device of a direct management target by communication with the first device, without intervention of the mediation apparatus,
the management apparatus being configured to manage the first device and/or the second device registered on the management apparatus as a device of an indirect management target via the mediation apparatus,
the mediation apparatus being configured to: receive device specifying information specifying the first device from the first device; and transmit a registration request to the management apparatus, the registration request requesting the management apparatus to register the first device as the indirect management target, the registration request comprising the received device specifying information,
the management program, when executed by the computer, causes the management apparatus to perform:
storing registered information, the registered information indicating devices of the direct management target and the indirect management target registered on the management apparatus;
receiving the registration request transmitted from the mediation apparatus;
determining whether the first device is registered as the direct management target or the indirect management target, based on the device specifying information included in the received registration request and the stored registered information; and
in a case it is determined that the first device is not registered as either the direct management target or the indirect management target, registering the first device as the indirect management target.

12. A device management system comprising:
a management apparatus;
a mediation apparatus configured to communicate with the management apparatus;
a first device configured to communicate with the management apparatus and the mediation apparatus; and
a second device configured to communicate with the mediation apparatus,
wherein the management apparatus is configured to manage the first device registered on the management apparatus as a device of a direct management target by communication with the first device, without intervention of the mediation apparatus,
wherein the management apparatus is configured to manage the first device and/or the second device registered on the management apparatus as a device of an indirect management target via the mediation apparatus, wherein the mediation apparatus comprises a controller configured to:
  receive related information about the first device from the first device;
  determine whether the first device is registered on the management apparatus as the direct management target or the indirect management target, based on the received related information; and
  in a case it is determined that the first device is not registered as either the direct management target or the indirect management target, transmit a registration request to the management apparatus, the registration request requesting the management apparatus to register the first device as the indirect management target.

13. The device management system according to claim 12,
wherein the management apparatus is configured to perform communication with the mediation apparatus and the first device by a first communication method,
wherein the mediation apparatus is configured to:
  perform communication with the first device by a second communication method; and
  perform communication with the second device by a third communication method, and
wherein the first communication method, the second communication method and the third communication method are different from one another.

14. The device management system according to claim 12,
wherein at least one of the first device and the second device comprises at least one of an image recorder and an image reader,
wherein the image recorder is configured to record an image based on image data on a to-be-recorded medium, and
wherein the image reader is configured to read an image recorded on a document and to generate image data indicative of the read image.

15. The device management system according to claim 12, wherein the management apparatus is configured to manage the device that is registered as the direct management target or the indirect management target, the management comprising receiving information from the device, changing a setting value that is used for the device, and/or deleting the setting value from the device.

* * * * *